(12) United States Patent
Akselrod et al.

(10) Patent No.: US 11,068,696 B2
(45) Date of Patent: Jul. 20, 2021

(54) PROTECTING INDIVIDUALS PRIVACY IN PUBLIC THROUGH VISUAL OPT-OUT, SIGNAL DETECTION, AND MARKER DETECTION

(71) Applicant: INTERNATIONAL BUSINESS MACHINES CORPORATION, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/245,954

(22) Filed: Aug. 24, 2016

(65) Prior Publication Data
US 2018/0061010 A1    Mar. 1, 2018

(51) Int. Cl.
*G06K 9/00* (2006.01)
*G08B 13/196* (2006.01)
(Continued)

(52) U.S. Cl.
CPC ..... *G06K 9/00228* (2013.01); *G06F 21/6245* (2013.01); *G06K 9/00288* (2013.01); *G06T 11/00* (2013.01); *G08B 13/19645* (2013.01); *G08B 13/19682* (2013.01); *G08B 13/19686* (2013.01); *H04N 21/4627* (2013.01)

(58) Field of Classification Search
CPC ............ G06F 21/6245; G06K 9/00771; G06K 9/00221–00261; G06K 9/00268–00281; G06K 9/00288–00295; G06K 9/00302; G06Q 50/00; G06Q 50/01; G06Q 50/10; G08B 13/19645; G08B 13/19682; G08B 13/19686; H04N 21/4627
See application file for complete search history.

(56) References Cited

U.S. PATENT DOCUMENTS 6,766,456 B1 *  7/2004  McKeeth ................ G06F 21/31
                                                                726/2
6,959,099 B2   10/2005  Gutta et al.
(Continued)

OTHER PUBLICATIONS

Cammozzo, A., "Face Recognition: Privacy Issues and Enhancing Techniques" The Research Center on Computing and Society (2014).*
(Continued)

*Primary Examiner* — Daniel B Potratz
*Assistant Examiner* — D'Arcy Winston Straub
(74) *Attorney, Agent, or Firm* — Tutunjian & Bitetto, P.C.; Scott Dobson

(57) ABSTRACT

A method for protecting anonymity of an individual in public is presented. The computer-implemented method may include registering a plurality of facial features associated with the individual, and, in response to capturing an image of the individual from a video stream, determining whether the facial features associated with the individual are registered. The computer-implemented method may further include, in response to the determination that the facial features associated with the individual are registered, obscuring the facial features of the individual captured from the video stream with an unidentifiable image.

20 Claims, 15 Drawing Sheets

(51) Int. Cl.
*H04N 21/4627* (2011.01)
*G06F 21/62* (2013.01)
*G06T 11/00* (2006.01)

(56) References Cited

U.S. PATENT DOCUMENTS

| | | | | |
|---|---|---|---|---|
| 7,440,594 | B2* | 10/2008 | Takenaka | G06K 9/00221 |
| | | | | 382/118 |
| 7,783,075 | B2* | 8/2010 | Zhang | H04N 7/147 |
| | | | | 382/103 |
| 8,126,190 | B2* | 2/2012 | Jung | G06K 9/00771 |
| | | | | 382/100 |
| 8,509,499 | B2 | 8/2013 | Ioffe et al. | |
| 9,430,673 | B1* | 8/2016 | Bowers | H04N 21/4627 |
| 9,582,681 | B2* | 2/2017 | Mishra | H04N 21/440245 |
| 2006/0104444 | A1* | 5/2006 | Hampapur | G08B 13/19686 |
| | | | | 380/210 |
| 2007/0286520 | A1* | 12/2007 | Zhang | H04N 7/147 |
| | | | | 382/264 |
| 2008/0255754 | A1* | 10/2008 | Pinto | G08G 1/096844 |
| | | | | 701/119 |
| 2015/0071503 | A1* | 3/2015 | Prabhakar | G06K 9/6215 |
| | | | | 382/117 |
| 2015/0104080 | A1* | 4/2015 | Holman | G06F 21/6209 |
| | | | | 382/115 |
| 2015/0142686 | A1* | 5/2015 | Baldwin | G06F 16/51 |
| | | | | 705/325 |
| 2015/0199575 | A1* | 7/2015 | Dudovich | G06F 16/51 |
| | | | | 382/103 |
| 2016/0104035 | A1* | 4/2016 | Wang | H04N 21/4318 |
| | | | | 382/118 |
| 2017/0337652 | A1* | 11/2017 | Sarin | G06Q 20/40145 |
| 2018/0205906 | A1* | 7/2018 | Boyle | H04N 21/4223 |

OTHER PUBLICATIONS

Cammozzo, A., "Face Recognition: Privacy Issues and Enhancing Techniques" The Research Center on Computing and Society (Year: 2014).*

Newton, E.M. et al., "Preserving privacy by de-identifying face images" IEEE Transactions on Knowledge and Data Engineering (2005) pp. 232-243, vol. 17, Issue: 2.

Cammozzo, A., "Face Recognition: Privacy Issues and Enhancing Techniques" The Research Center on Computing and Society (2014) Posted on Feb. 19, 2014 by Eric Gossett, pp. 1-3.

Dantone, M. et al., "Real-time Facial Deature Detection using Conditional Regression Forests" 2012 IEEE Conference on Computer Vision and Pattern Recognition (Jun. 2012) pp. 2578-2585.

* cited by examiner

US 11,068,696 B2

PROTECTING INDIVIDUALS PRIVACY IN PUBLIC THROUGH VISUAL OPT-OUT, SIGNAL DETECTION, AND MARKER DETECTION

BACKGROUND

Technical Field

The present invention relates generally to image processing, and more specifically, to automatically obscuring/blurring or rendering facial images of individuals captured from real-time video streams unidentifiable or unrecognizable.

Description of the Related Art

Recent advances in computer networking and processing make images easily accessible. However, public access of images, especially images containing human faces raises concerns about privacy. There have been some previous efforts to protect the privacy of people appearing in an image by making their faces unrecognizable to obscure their identities. To obscure a face in an image, a region containing the face has to be identified first. Automatic face detection techniques can help to identity face regions when processing a large number of images. However, the accuracy of automatic face detection techniques raises concerns. There can be false positives where detected regions do not correspond to faces. There can also be regions containing faces that are not detected.

SUMMARY

In accordance with one embodiment of the present principles, a computer-implemented method for protecting anonymity of an individual is provided. The computer-implemented method includes the step of registering a plurality of facial features associated with the individual. The computer-implemented method further includes the step of, in response to capturing an image of the individual from a video stream, determining whether the facial features associated with the individual are registered. The computer-implemented method further includes the step of, in response to the determination that the facial features associated with the individual are registered, obscuring the facial features of the individual captured from the video stream with an unidentifiable image.

In accordance with one embodiment of the present principles, a computer-implemented method for protecting anonymity of an individual is provided. The computer-implemented method includes the steps of capturing an image of the individual from a video stream, determining whether an electronic identifier associated with the individual transmits one or more signals, and in response to the determination that the one or more signals of the electronic identifier associated with the individual are privacy signals, obscuring the facial features of the individual captured from the video stream with an unidentifiable image.

In accordance with another embodiment of the present principles, a system for protecting anonymity of an individual is provided. The system includes a memory to store a plurality of facial features associated with and registered by the individual and a processor to analyze an image of the individual captured from a video stream, the processor configured to determine whether the facial features associated with the individual are registered. Moreover, in response to the determination that the facial features associated with the individual are registered, the facial features of the individual captured from the video stream are obscured with an unidentifiable image.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

Figure 1:
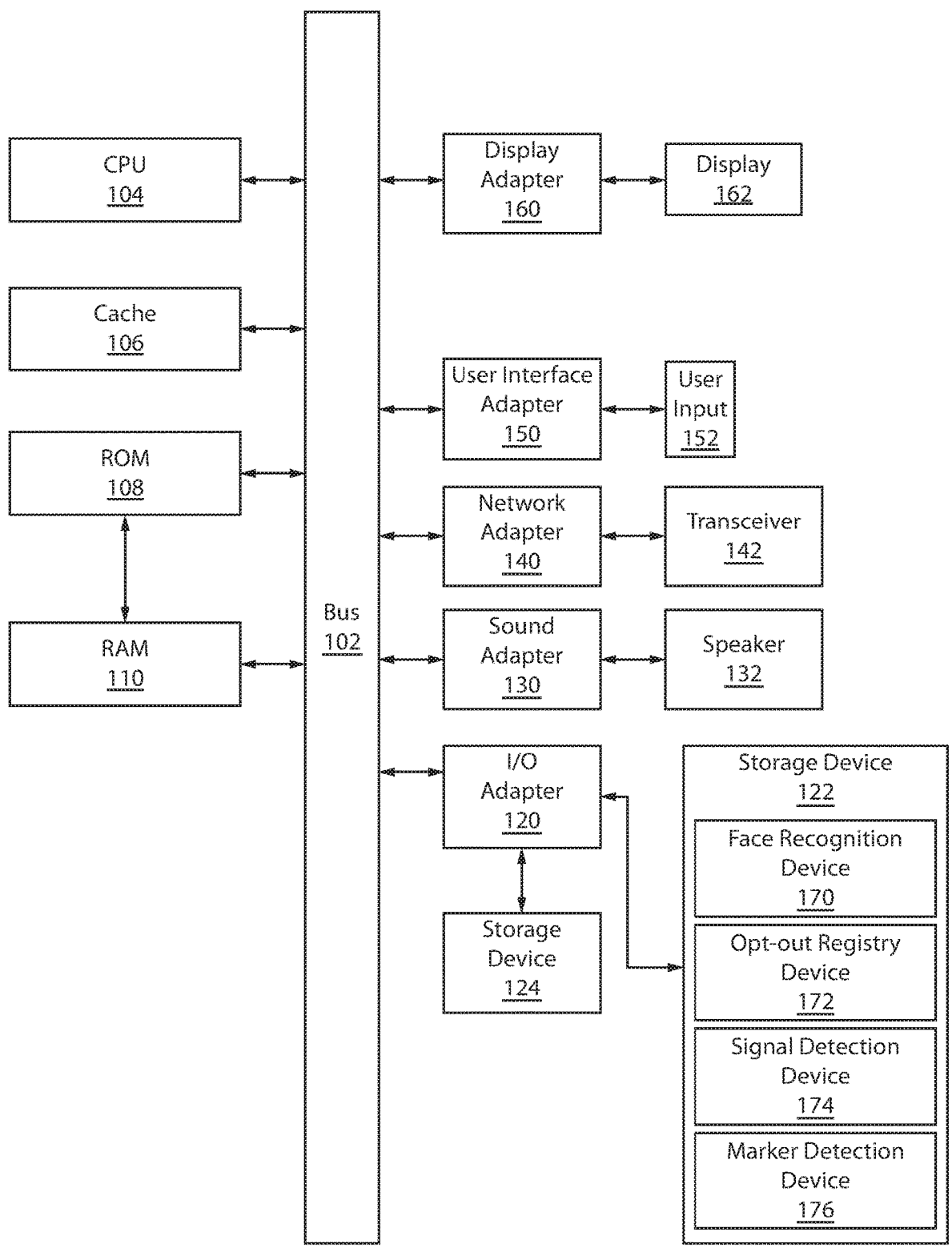
FIG. 1 is a block/flow diagram of an exemplary computing system for protecting anonymity of an individual, in accordance with an embodiment of the present principles.

The present principles are directed to systems and methods for protecting anonymity of an individual in public. In some embodiments, the present principles provide systems, methods and computer program products for identifying individuals and/or detecting signals/items on a person, and reacting to such detection of signals and/or items and/or markers. Once the individual is identified, the individual's facial features may be automatically blurred or obscured or obstructed or made unidentifiable or unrecognizable when digitally processed in real-time, thus preventing such individuals from being identified, for example, during a live filming or recording.

In one or more embodiments, an implementation of the systems and methods is performed through a registry (e.g., opt-out registry) and facial recognition device. Individuals may register their faces in a registry (similar to registering a telephone number in a "do-not-call" list). Then when individuals are filmed or recorded in public, such devices would detect the faces of the individuals and determine if such faces were registered in the registry. If they are registered, the faces are blurred or otherwise made unidentifiable or unrecognizable in the recording. In another embodiment, if registry look-up exceeds a predetermined time, an alternative is to blur all the faces detected in the recording or filming by default, and as confirmation comes back from the registry, the blur or unidentifiable image is removed from those individuals that are not registered in the registry.

In one or more embodiments, another implementation involves individuals wearing or handling or operating an electronic tag or electronic identifier or a mobile electronic device. The electronic identifier emits, for example, a signal, such as radio waves or invisible light, to represent individuals that want to retain their visual privacy in public settings or recording made in public (with or without their knowledge). Signal detection devices, for example, incorporated in the video camera, would detect the one or more signals and ensure that the individual would not be recognized when filmed or recorded.

Another implementation involves using passive devices or non-electronic devices, such as a marker or pin or item that may be wearable by the individual. Alternatively, such marker or pin or item may not be wearable, but handled or operated by the individual or be in the vicinity of the individual. Recording devices, such as video cameras, recognize that the marker or item indicates that the person wants to remain anonymous, and, thus ensure that such individuals would not be recognized when filmed or recorded in real-time.

The systems and methods provide for different techniques of acquiring live video streams and performing real-time analysis, at the source (e.g., the video camera), to determine whether an individual's identity and image needs to be protected while that individual is being filmed or recorded. Therefore, a real-time computer implemented method is presented for protecting an individual's privacy or anonymity in public places when being recorded or filmed, whether knowingly or unknowingly. In one example, an opt-out registry may be created and maintained, which is in constant communication with a plurality of video cameras. In another example, the computer implemented methods may be software-based and licensed to a plurality of vendors.

Referring now to the drawings in which like numerals represent the same or similar elements and initially to FIG. 1, a block/flow diagram of an exemplary computing system for protecting anonymity of individuals is presented, in accordance with an embodiment of the present principles.

An exemplary anonymity protection processing system 100 to which the present principles may be applied is shown in accordance with one embodiment. The anonymity protection processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with a face recognition device 170, an opt-out registry device 172, a signal detection device 174, and a marker detection device 176 for anonymity protection.

The face recognition device 170, the opt-out registry device 172, the signal detection device 174, and the marker detection device 176 may be associated with the storage device 122. Such devices 170, 172, 174, 176 need not be incorporated within the storage device 122. Such devices 170, 172, 174, 176 may be external to the storage device 122. One skilled in the art may contemplate different system and networking configurations for incorporating the devices 170, 172, 174, 176 therein.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A user input device 152 is operatively coupled to system bus 102 by user interface adapter 150. The user input device 152 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 152 can be the same type of user input device or different types of user input devices. The user input device 152 may be used to input and output information to and from the anonymity protection processing system 100.

Of course, the anonymity protection processing system 100 may also include other elements (not shown), as readily contemplated by one of skill in the art, as well as omit certain elements. For example, various other input devices and/or output devices can be included in the anonymity protection processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the anonymity protection processing system 100 are readily contemplated by one of ordinary skill in the art given the teachings of the present principles provided herein.

Figure 2:
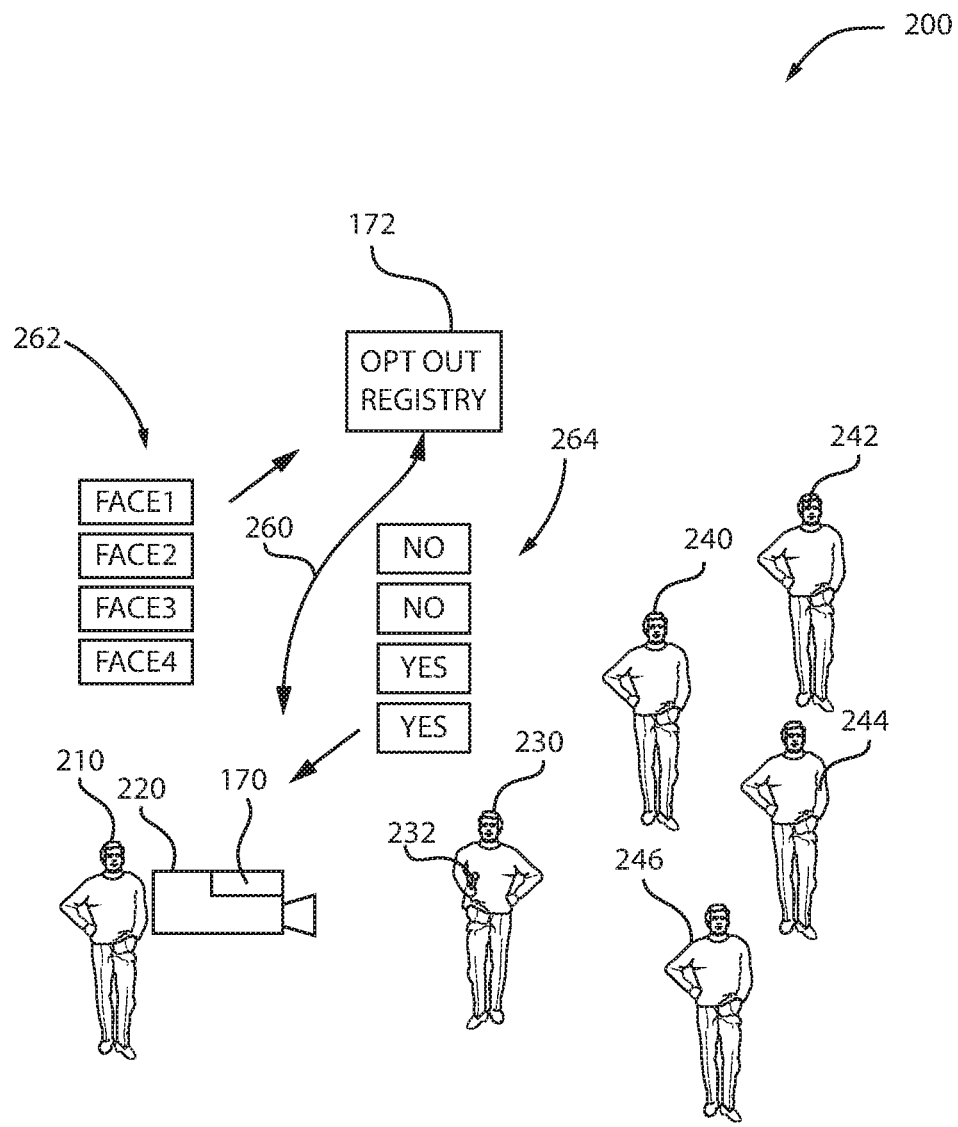
FIG. 2 illustrates a system for capturing individuals in video streams and protecting the anonymity of such individuals registered with an opt-out registry, in accordance with an embodiment of the present principles.

FIG. 2 illustrates a system for capturing individuals in video streams and protecting the anonymity of such individuals registered with an opt-out registry, in accordance with an embodiment of the present principles.

The system 200 includes, for example, a cameraman 210 operating a video capturing device 220 (or video camera). The video camera 220 may include a face recognition device 170. The cameraman 210 may film or record a reporter 230 holding a microphone 232 who is covering, e.g., a news story. As the reporter 230 is covering the news story, several individuals 240, 242, 244, 246 may be filmed, e.g., in the background. These individuals may or may not know that they are being filmed or recorded.

The face recognition device 170 captures a plurality of facial features 262 associated with each individual 240, 242, 244, 246. Once captured, these facial features 262 of each individual 240, 242, 244, 246 are automatically transmitted, in real-time, to an opt-out registry 172. The opt-out registry 172 may be a centralized nationwide registry service enabling subscribers to "opt-out" of any video recording or filming made in public. The registry service 172 allows individuals to submit one or more facial images through, e.g., the Internet or through their wireless device. These facial images are uploaded to the database of the opt-out registry 172. The opt-out registry 172 allows for the prevention of images of individuals from being filmed or recorded without their consent, as described below.

For example, in FIG. 2, there are 4 individuals 240, 242, 244, 246 that were filmed during a news story covered by the reporter 230. The video camera 220 captured "FACE 1" of the first individual 240, "FACE 2" of the second individual 242, "FACE 3" of the third individual 244, and "FACE 4" of the fourth individual 246 during the filming of the news story. The facial images may be collected and designated as 262. The video camera 220 determines whether the facial features 262 associated with each individual 240, 242, 244, 246 are registered with the opt-out registry 172. In one embodiment, the video camera 220 may send all the facial images 262, as a package, to the opt-out registry 172. In another embodiment, the video camera 220 may send the facial images 262 one by one as they are being obtained or recorded. Regardless, there is constant and continuous communication 260 between the video camera 220 and the opt-out registry 172. The opt-out registry 172 compares the received facial images 172 with images stored in its database. If a match is determined, then the facial images of those individuals are obscured. If a match is not found, then the facial images of those individuals remain in their original unobstructed or unobscured state.

For example, regarding "FACE 1" of the first individual 240, the opt-out registry 172 returned an indication 264 that no match has been found in the opt-out database. Regarding "FACE 2" of the second individual 242, the opt-out registry 172 returned an indication 264 that no match has been found in the opt-out database. Therefore, the facial features 262 of the first and second individuals 240, 242 need not be obscured or obstructed or blurred or modified in any way. In other words, individuals 240, 242 did not register their facial images with the opt-out registry 172, and, thus, their facial images may be freely used during a recording or filming.

Regarding "FACE 3" of the third individual 244, the opt-out registry 172 returned an indication 264 that a match has been found in the opt-out database. Regarding "FACE 4" of the fourth individual 246, the opt-out registry 172 returned an indication that a match has been found in the opt-out database. Therefore, the facial features 262 of the third and fourth individuals 244, 246 need to be obscured or obstructed or blurred or modified in some way to make FACES 3 and 4 unrecognizable or unidentifiable. In other words, individuals 244, 246 did register their facial images with the opt-out registry 172.

When the facial recognition device 170 of the video camera 220 detects one or more faces during a filming or recording, the facial images are collected and automatically, in real-time, transmitted from the video camera 220 to the opt-out registry 172. A comparison is made between the images collected by the video camera 220 and the images stored in the opt-out registry 172 to determine whether a match exists. If a match does exist, then a signal 260 is sent from the opt-out registry 172 to the video camera 220 to prompt or trigger the video camera 220 to obscure or blur the facial images of such individuals. If a match does not exists, then a signal 260 is sent from the opt-out registry 172 to the video camera 220 to notify the video camera 220 to leave those facial images "as-is" in their original unobscured or unobscured state.

Therefore, the system 200 protects an individual's privacy in public, when that individual is being filmed or recorded, whether knowingly or unknowingly, through, e.g., an opt-out registry 172. In other words, an individual's privacy in public is protected during real-time video streams and the processing occurs in real-time as the filming takes place. As the video stream is being received by the video camera 220, the video camera 220, in real-time, processes any facial images detected and, in real-time, communicates with the opt-out registry 172. Two-way communication 260 between the video camera 220 and the opt-out registry 172 occurs continuously, in an uninterrupted manner, and in real-time. The communication 260 may be a wireless communication.

In one or more embodiments, in order to obscure a face in a raw image, the region that contains the face needs to be detected first. This is performed by the face detection or recognition device 170, which may execute a face recognition algorithm. Because the purpose of identity masking is to obscure identities of individuals whose faces appear in an image, the face detection algorithm needs to identify possible face regions in the image. The facial recognition device 170 determines human faces in images. The facial recognition device 170 determines locations in images for all human faces and can determine particular faces. Optionally, the facial recognition device 170 may determine the presence of human skin in images.

In one or more embodiments, facial recognition device 170 analyzes input video, which comprises a series of images in this example. Facial recognition device 170 examines each image to determine faces in the images and their locations and, generally, the approximate size of the faces. The facial recognition device 170 also determines particular faces in the image. Optionally, the facial analysis process may simply examine images to search for human skin.

In one or more embodiments, the determination of whether the facial features associated with the individual are registered is performed in a predetermined time. If the predetermined time exceeds a threshold, then the system 200 uses an unidentifiable image by default. After the predetermined time exceeds the threshold and in response to a positive acknowledgement that the facial features associated with the individual are registered, the unidentifiable image is maintained on the image of the individual. Further, after the predetermined time exceeds the threshold and in response to a negative acknowledgement that the facial features associated with the individual are registered, the system 200 reverts back to the image of the individual captured from the video stream. Therefore, a predetermined time may be associated with the face recognition processing. In order to protect one's identity when being filmed, it may be necessary to insert default images for each detected individual until the face recognition processing is complete.

Figure 3:
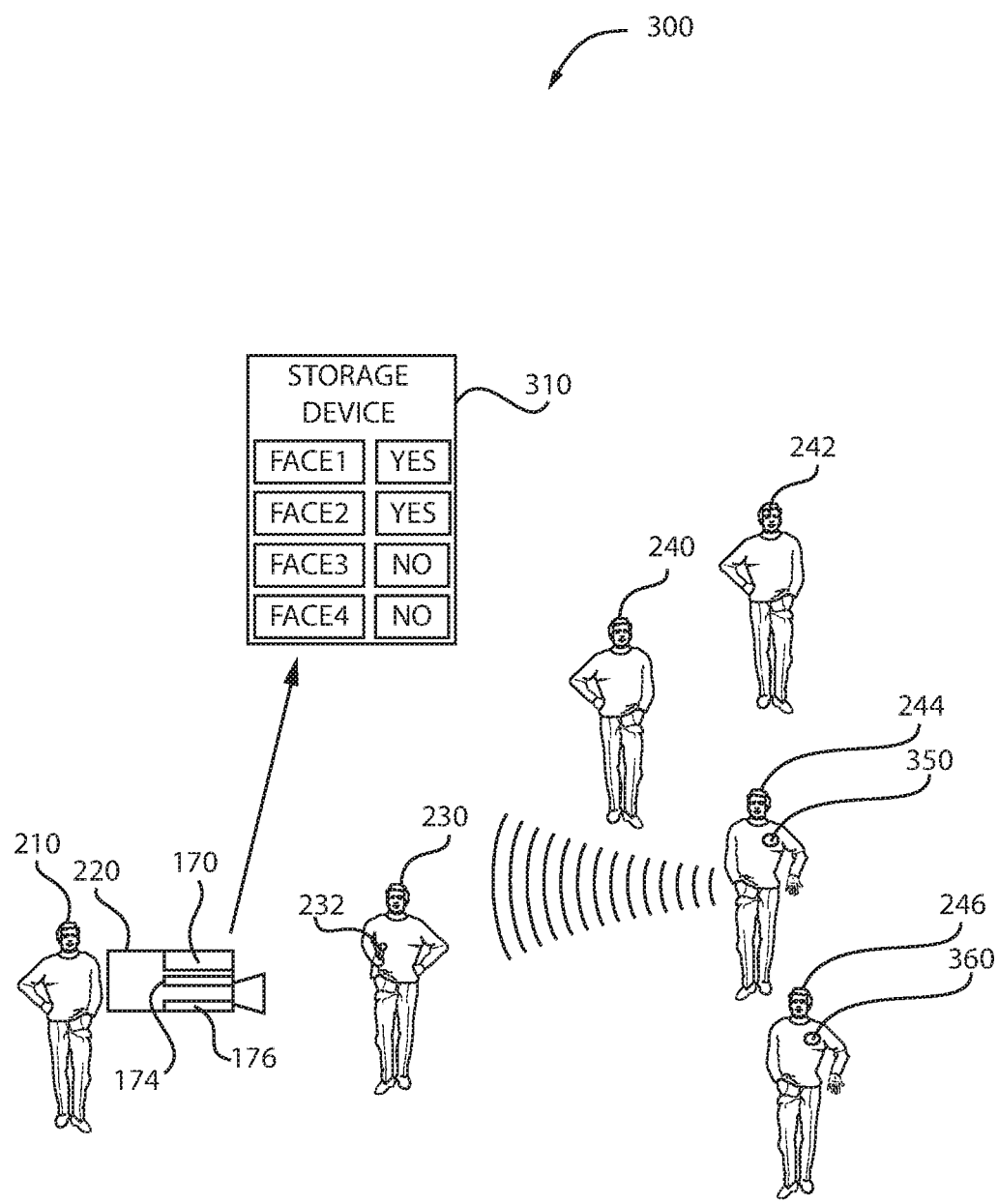
FIG. 3 illustrates a system for capturing individuals in video streams and protecting the anonymity of such individuals by identifying signals and/or markers associated with the individuals, in accordance with an embodiment of the present principles.

FIG. 3 illustrates a system for capturing individuals in video streams and protecting the anonymity of such individuals by identifying signals and/or markers associated with the individuals, in accordance with an embodiment of the present principles.

The system 300 includes, for example, a cameraman 210 operating a video capturing device 220 (or video camera). The video camera 220 may include a face recognition device 170, a signal detection device 174, and a marker detection device 176. The cameraman 210 may film or record a reporter 230 holding a microphone 232 who is covering, e.g., a news story. As the reporter 230 is covering the news story, several individuals 240, 242, 244, 246 may be filmed in the background. These individuals may or may not know that they are being filmed.

The face recognition device 170 captures a plurality of facial features 262 associated with each individual 240, 242, 244, 246.

The signal detection device 174 captures one or more signals emitted from an electronic tag or electronic identifier 350. For example, individual 244 has an electronic identifier 350 that emits a signal to the video camera 220. The signal may be, e.g., an RF signal or an infrared signal or a radio wave or an electromagnetic wave or any other signal contemplated by one skilled in the art. The electronic identifier 350 may be worn by the user. In another embodiment, the electronic identifier 350 may be incorporated with a mobile device handled or operated or owned by the individual 244. In another embodiment, the electronic identifier 350 may be incorporated with a smart watch worn by the individual 244. One skilled in the art may contemplate incorporating the electronic identifier 350 with any type of electronic device associated (e.g., worn or handled or operated) with the individual 244.

The marker detection device 176 detects an item or marker 360 associated with an individual captured by the video camera 220. The marker 360 may be a distinctive marker. In one example, the marker 360 is a pin worn by the individual 246. In another example embodiment, the marker 360 is an item of clothing having an identifying symbol or character or logo or design. One skilled in the art may contemplate any type of passive item or marker to indicate to the video camera 220 that this individual wants to remain anonymous. Once the item or marker 360 is detected by the video camera 220, the video camera 220 automatically obscures or obstructs or blurs the facial features of the individual to make the facial features unrecognizable or unidentifiable.

For example, in FIG. 3, there are 4 individuals 240, 242, 244, 246 that were filmed during a news story covered by reporter 230. The video camera 220 captured "FACE 1" of the first individual 240, "FACE 2" of the second individual 242, "FACE 3" of the third individual 244, and "FACE 4" of the fourth individual 246 during the filming of the news story. In one embodiment, the facial images may be collected and sent to a storage device 310. The video camera 220 determines whether the facial features associated with each individual 240, 242, 244, 246 should be obstructed or not. The video camera 220 may determine whether an electronic identifier 350 or a passive marker 360 is associated with individuals 240, 242, 244, 246.

For example, regarding "FACE 1" of the first individual 240, it was determined that no signal was detected and no marker was identified. Regarding "FACE 2" of the second individual 242, it was determined that no signal was detected and no marker was identified. Therefore, the facial features of individuals 240, 242 need not be obscured or obstructed or blurred or modified in any way.

Regarding "FACE 3" of the third individual 244, it was determined that a signal was detected. Regarding "FACE 4" of the fourth individual 246, it was determined that a marker was identified. Therefore, the facial features of individuals 244, 246 need to be obscured or obstructed or blurred or modified in some way to make FACES 3 and 4 unrecognizable or unidentifiable for such recording or filming.

Therefore, the system 300 protects an individual's privacy in public, when that individual is being filmed or recorded, whether knowingly or unknowingly, through, e.g., a signal detection device 174 and/or a marker detection device 176. In other words, an individual's privacy in public is protected during real-time video streams and the processing occurs in real-time as the filming takes place. As the video stream is being received by the video camera 220, the video camera 220, in real-time, processes any facial images detected and, in real-time, communicates with the signal detection device 174 and/or a marker detection device 176. Two-way communication between the video camera 220 and the signal detection device 174 and/or a marker detection device 176 occurs continuously, in an uninterrupted manner, and in real-time.

Therefore, in FIGS. 2 and 3, the filtering of the video stream occurs at the source (i.e., the video camera 220) in order to enhance security and to protect privacy concerns, and the filtering occurs by using multiple detection modes (i.e., facial images, detection of signals, detection of distinctive items/markers) to protect an individual's privacy in public. Additionally, it is contemplated that all detection modes work in tandem. For example, an individual may register with the opt-out registry 172 of FIG. 2 and also operate, e.g., a mobile device (electronic tag or identifier 350 of FIG. 3) that emits one or more signals when in the vicinity of the video camera 220. The video camera 220 may have the capability to processes several identifiers (electronic, non-electronic), as well as have access to the opt-out registry 172 to determine whether to obstruct or obscure facial images captured during video streams.

Figure 4:
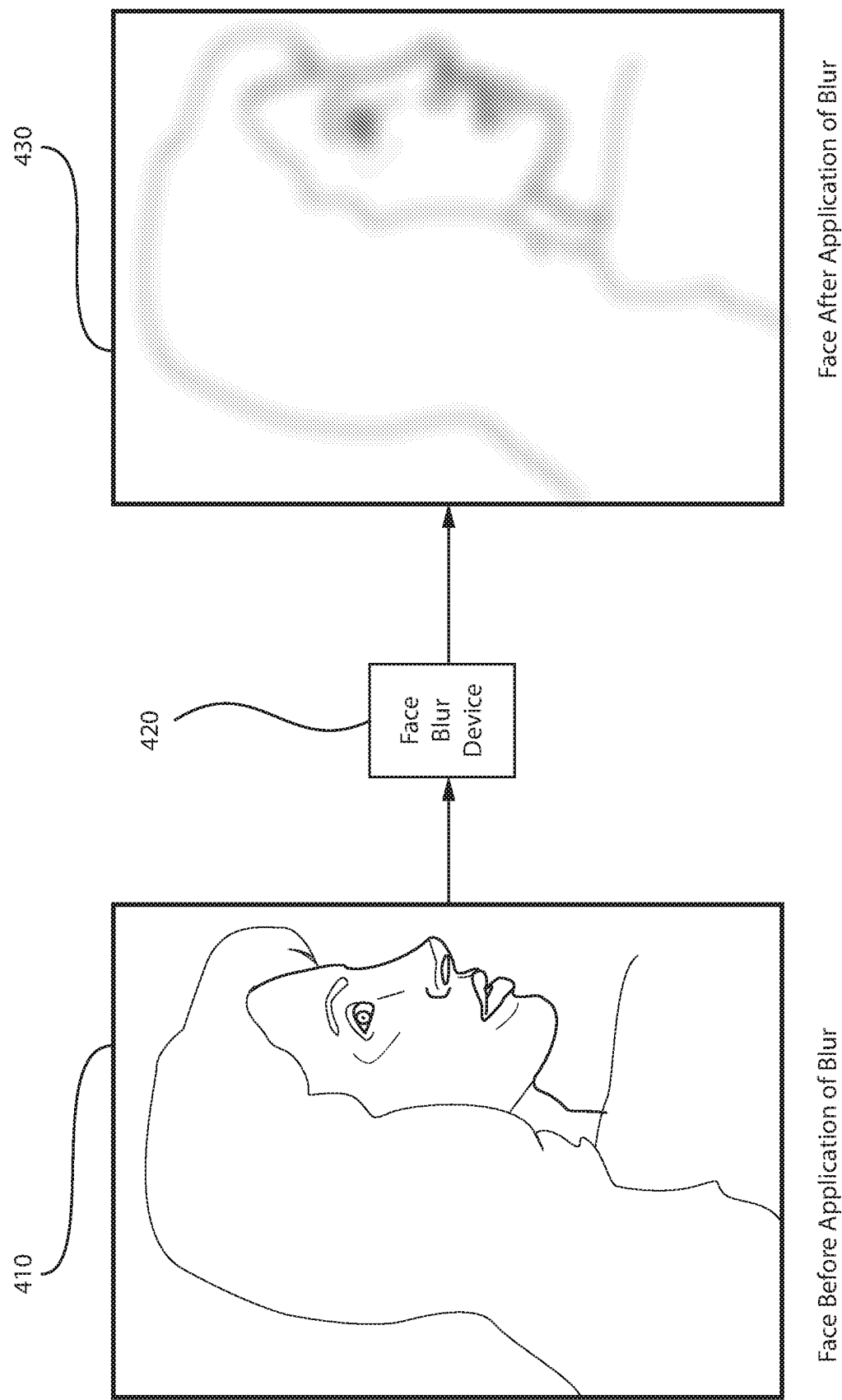
FIG. 4 illustrates an example of facial blurring, in accordance with an embodiment of the present principles.

FIG. 4 illustrates an example of facial blurring, in accordance with an embodiment of the present principles.

Face blur device 420 can use a motion blur algorithm to make the original face region in an image 410 appear as if the face has been photographed while in motion or out of focus. FIG. 4 shows an illustration of motion blur. The original detected face region 410 is processed by motion or face blur device 420 using a motion blur algorithm. The output is a motion blurred face region 430.

Figure 5:
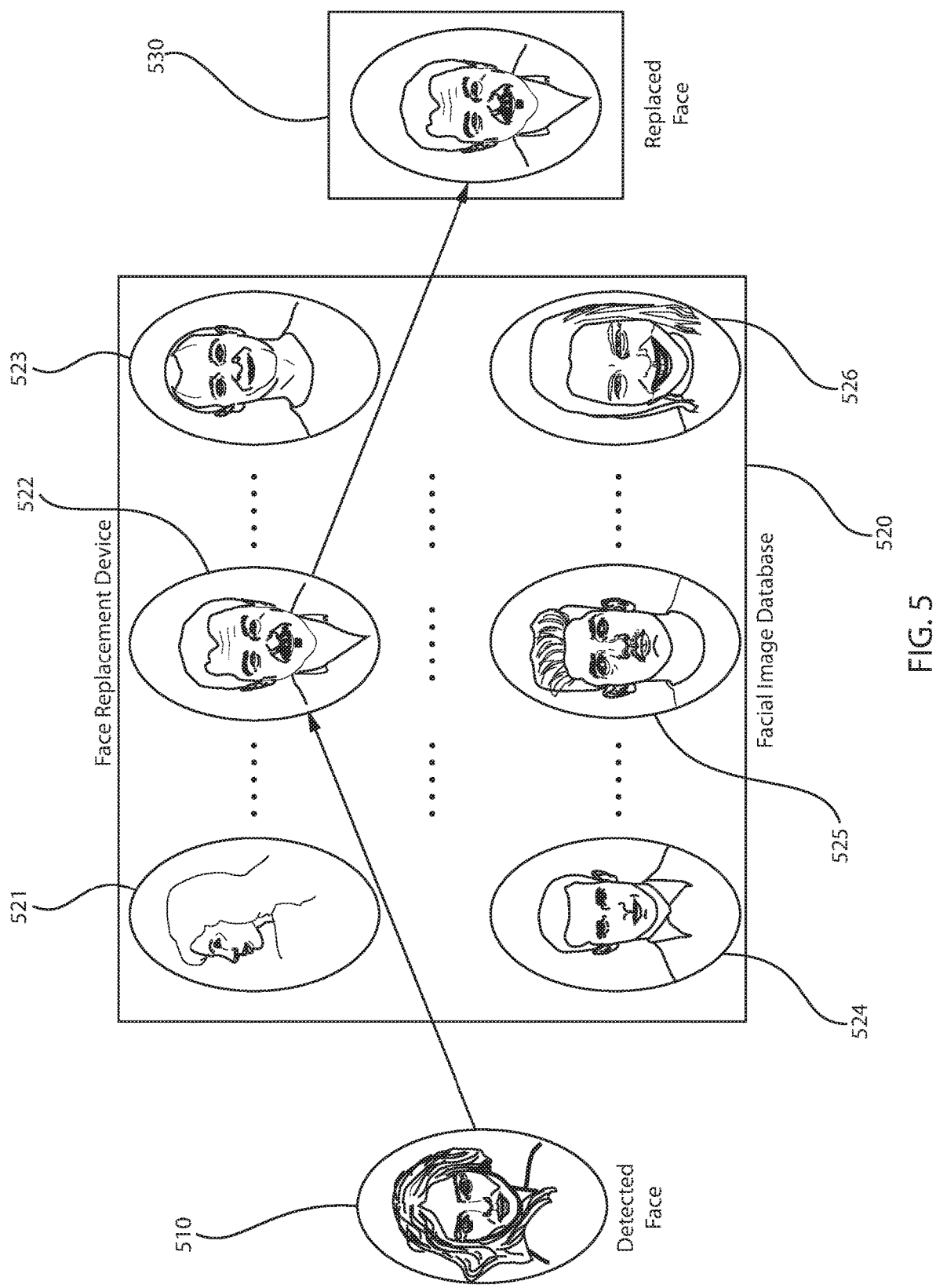
FIG. 5 illustrates an example of facial image replacement by using a facial image database, in accordance with an embodiment of the present principles.

FIG. 5 illustrates an example of facial image replacement by using a facial image database, in accordance with an embodiment of the present principles.

Another possible way to obscure the identity of a face is by replacing the face with a substitute facial image. The substitute facial image can be a facial image not subject to privacy concerns, or a generated face different than the original face. There are many techniques available to generate a face. For example, in one embodiment, a face may be generated from a 3D computer graphics model, which can match the lighting in the image. Face replacement using such generated faces can have result in a more natural appearance of the image than other replacement methods.

FIG. 5 illustrates one way to replace a detected face region with a substitute facial image 521, 522, 523, 524, 525, 526 that is selected from a facial database 520. First by looking up the facial image database 520, a substitute facial image may be selected based on the profile of the detected face region 510. The profile may include orientation, facial features (e.g. size, eyes, nose, mouth, etc.), or even three-dimensional information, such as depth of the face. In order to replace the detected face without affecting neighboring regions of the image, the substitute facial image may have a similar orientation and size as the detected face. It can also have similar positions of facial features. Then the detected face region 510 is replaced by, e.g., the substitute facial image 522. In an alternative embodiment, a substitute facial image can be generated by mixing the selected facial image with the detected face region. Because the generated facial image is different than the original detected face region, the identity of detected face region 510 is obscured. The output is a replaced face region 530.

Figure 6:
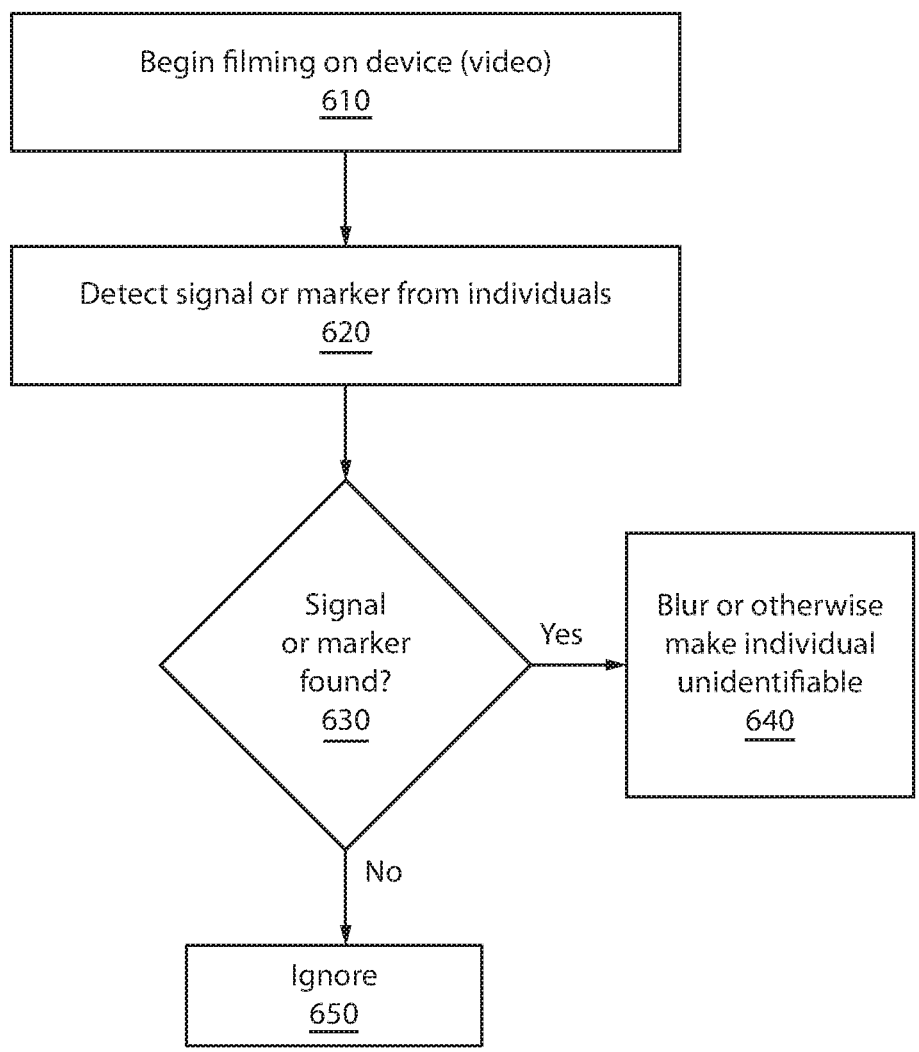
FIG. 6 is a block/flow diagram of an exemplary method for detecting a signal or marker associated with an individual captured in a video stream, in accordance with an embodiment of the present principles.

FIG. 6 is a block/flow diagram of an exemplary method for detecting a signal or marker associated with an individual captured in a video stream, in accordance with an embodiment of the present principles.

At block 610, filming or recording is commenced via a video camera or video capture device that captures live video streams.

At block 620, a signal or marker associated with an individual is search for.

At block 630, it is determined whether a signal or marker associated with the individual has been detected. If "YES," the process proceeds to block 640. If "NO," the process proceeds to block 650.

At block 640, the facial image of the individual is blurred or obscured to render the facial image of the individual unrecognizable or unidentifiable.

At block 650, if no signal is detected or no marker is identified in the vicinity of the individual, then the facial features of the individual are ignored. In other words, the facial images captured are used in the captured video stream.

Figure 7:
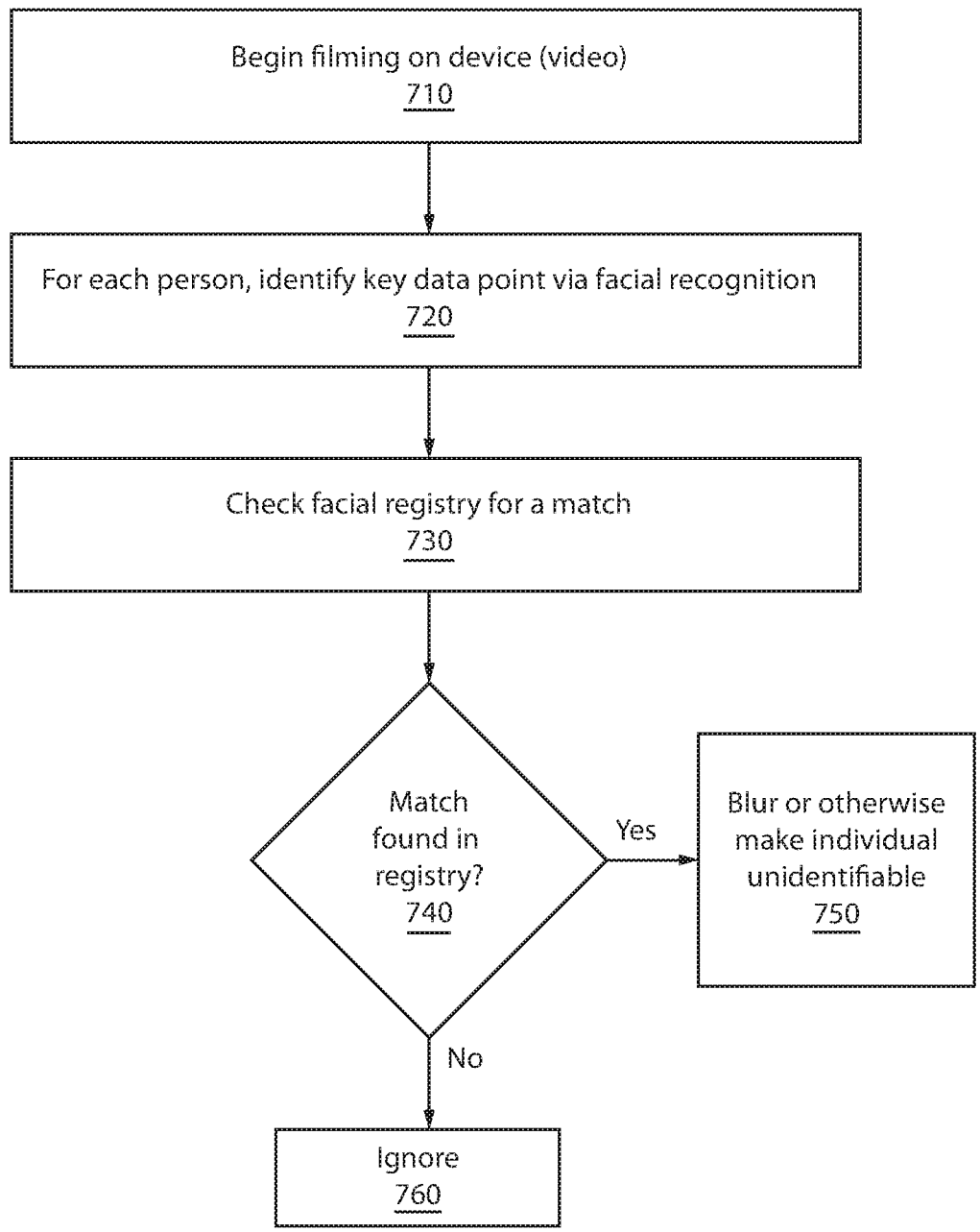
FIG. 7 is a block/flow diagram of an exemplary method for detecting facial images of individuals in a live video stream and checking a facial registry for a match, in accordance with an embodiment of the present principles.

FIG. 7 is a block/flow diagram of an exemplary method for detecting facial images of individuals in a live video stream and checking a facial registry for a match, in accordance with an embodiment of the present principles.

At block 710, filming or recording is commenced via a video camera or video capture device that captures live video streams.

At block 720, for each individual captured in the live video stream, data points are identified via facial recognition.

At block 730, an opt-out facial registry is checked to determine if a match exists.

At block 740, it is determined whether a match exists between the facial image captured by the live video stream and the images registered in the registry. If "YES," the process proceeds to block 750. If "NO," the process proceeds to block 760.

At block 750, the facial image of the individual is blurred or obscured to render the facial image of the individual unrecognizable or unidentifiable.

At block 760, if no match is found in the registry, then the facial features of the individual are ignored. In other words, the facial images captured are used in the captured video stream.

Figure 8:
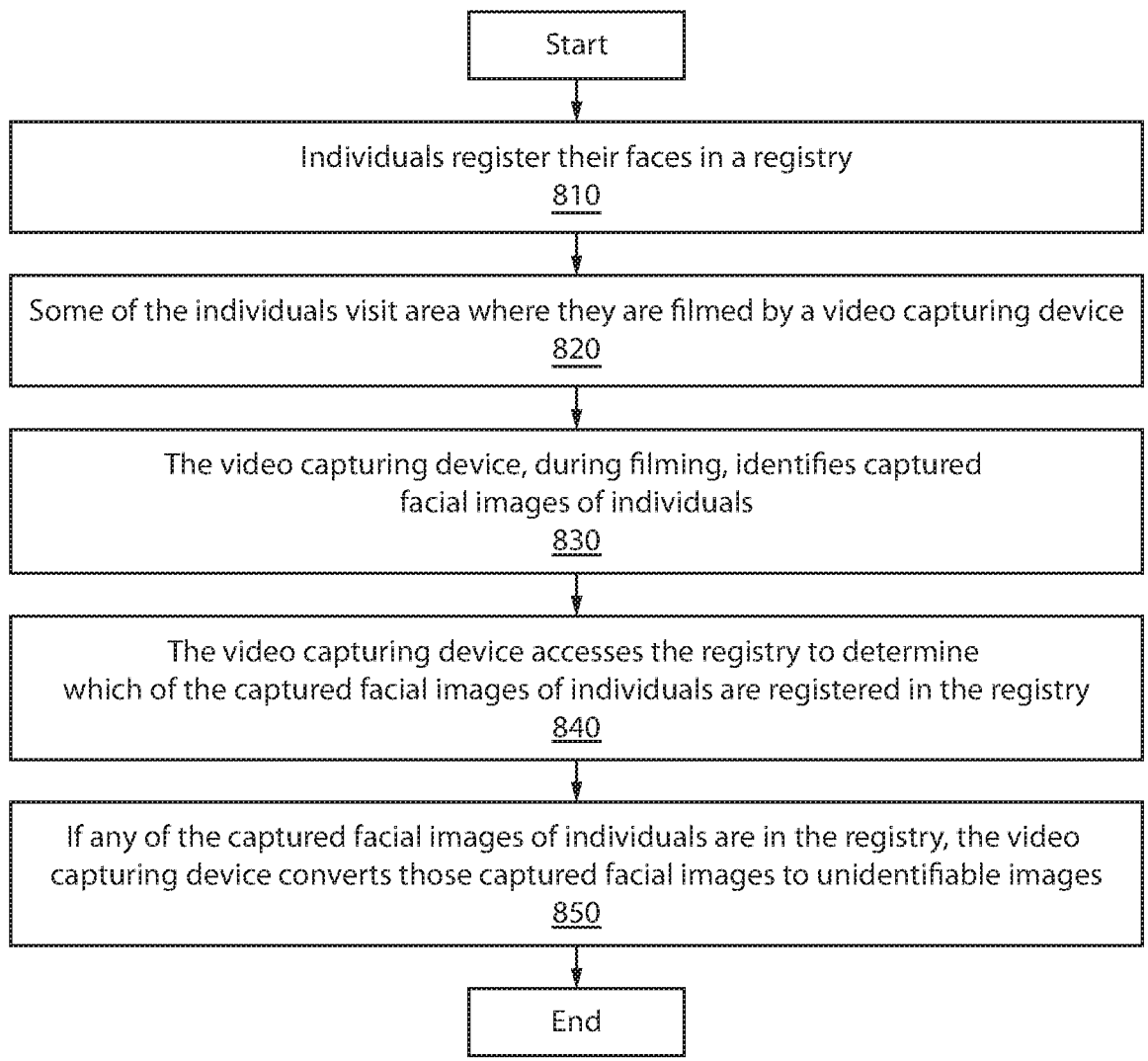
FIG. 8 is a block/flow diagram of an exemplary method for converting positive matches of facial images of individuals captured in a live video stream and found in a registry to unidentifiable images, in accordance with an embodiment of the present principles.

FIG. 8 is a block/flow diagram of an exemplary method for converting positive matches of facial images of individuals captured in a live video stream and found in a registry to unidentifiable images, in accordance with an embodiment of the present principles.

At block 810, individuals register their faces in a registry.

At block 820, one or more individuals visit areas or regions or sites where they are filmed or recorded by a video capturing device, such as a video camera.

At block 830, during recording, the video camera captures facial images of individuals.

At block 840, the video camera, in real-time, as it is recording, accesses the registry to determine which of the captured facial images of individuals are registered in the registry.

At block 850, if any of the captured facial images of individuals are registered in the registry, the video camera automatically converts the captured facial images to unidentifiable or unrecognizable images.

Figure 9:
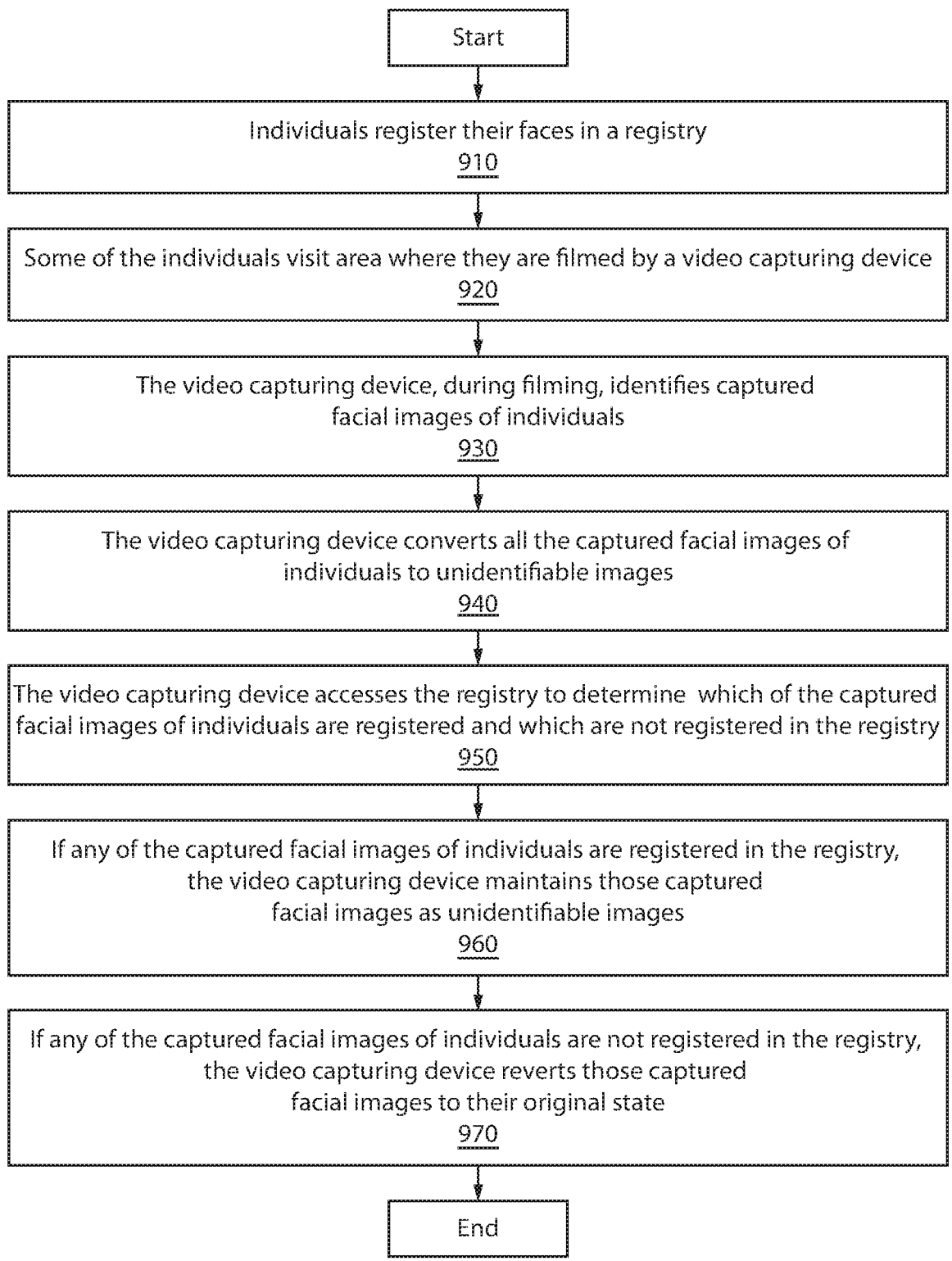
FIG. 9 is a block/flow diagram of an exemplary method for converting all facial images of individuals in a live video stream to unidentifiable images if the processing exceeds a predetermined time, in accordance with an embodiment of the present principles.

FIG. 9 is a block/flow diagram of an exemplary method for converting all facial images of individuals in a live video stream to unidentifiable images if the processing exceeds a predetermined time, in accordance with an embodiment of the present principles.

At block 910, individuals register their faces in a registry.

At block 920, one or more individuals visit areas or regions or sites where they are filmed or recorded by a video capturing device, such as a video camera.

At block 930, during recording, the video camera captures facial images of individuals.

At block 940, the video camera converts all the captured facial images of individuals to unidentifiable or unrecognizable images. In one example, this may occur due to a processing time exceeding a predetermined threshold.

At block 950, the video camera accesses the registry to determine which of the captured facial images of individuals are registered in the registry and which are not registered in the registry.

At block 960, if any of the captured facial images of individuals are registered in the registry, the video capturing device maintains those captured facial images as unidentifiable or unrecognizable images.

At block 970, if any of the captured facial images of individuals are not registered in the registry, the video capturing device reverts those captured facial images to their original state.

Figure 10:
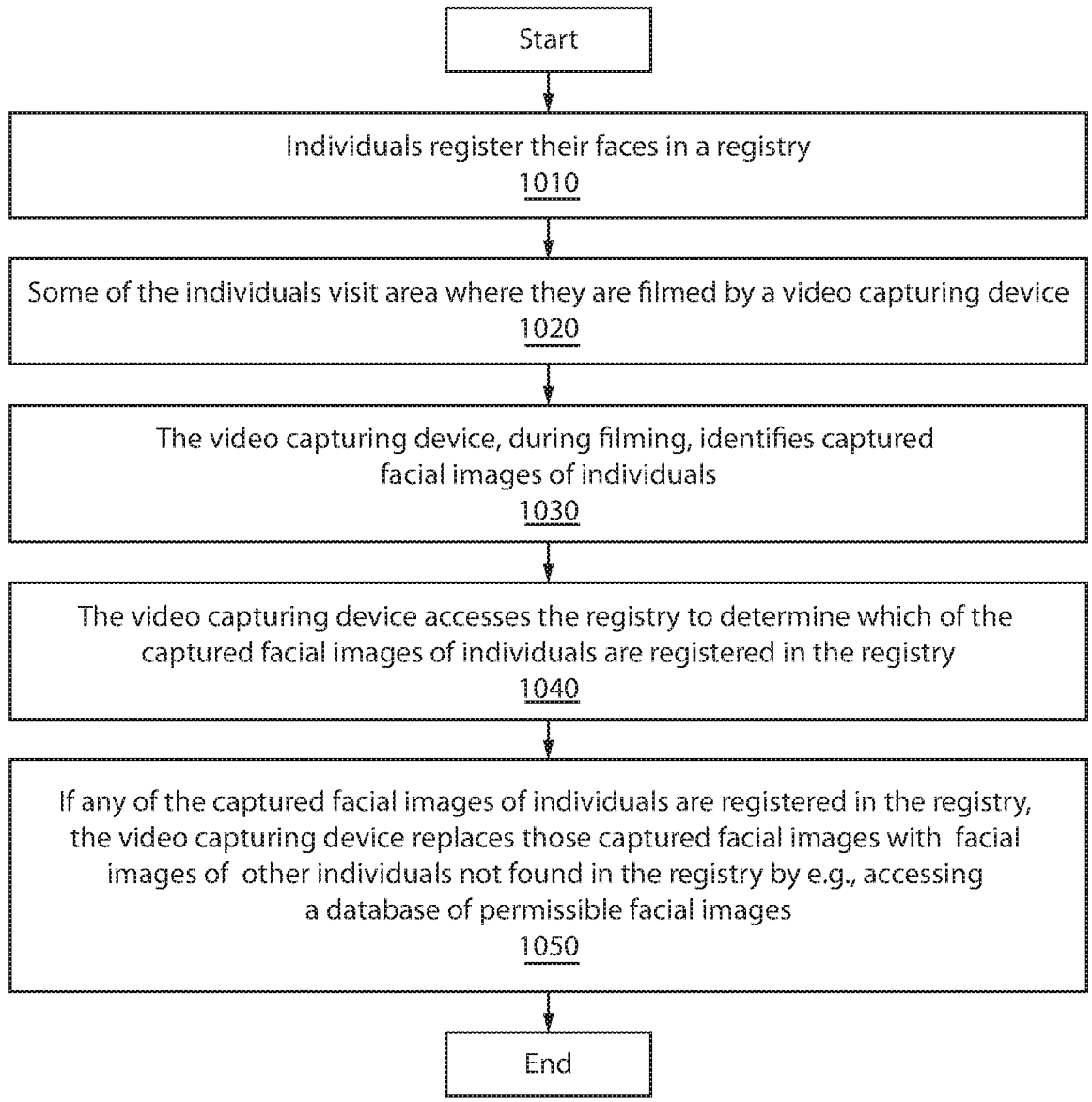
FIG. 10 is a block/flow diagram of an exemplary method for replacing facial images of individuals in a live video stream with facial images of other individuals, in accordance with an embodiment of the present principles.

FIG. 10 is a block/flow diagram of an exemplary method for replacing facial images of individuals in a live video stream with facial images of other individuals, in accordance with an embodiment of the present principles.

At block 1010, individuals register their faces in a registry.

At block 1020, one or more individuals visit areas or regions or sites where they are filmed or recorded by a video capturing device, such as a video camera.

At block 1030, during recording, the video camera captures facial images of individuals.

At block 1040, the video capturing device accesses the registry to determine which of the captured facial images of individuals are registered in the registry.

At block 1050, if any of the captured facial images of individuals are registered in the registry, the video capturing device replaces those captured facial images with facial images of other individuals not found in the registry by, e.g., accessing a database of permissible facial images.

Figure 11:
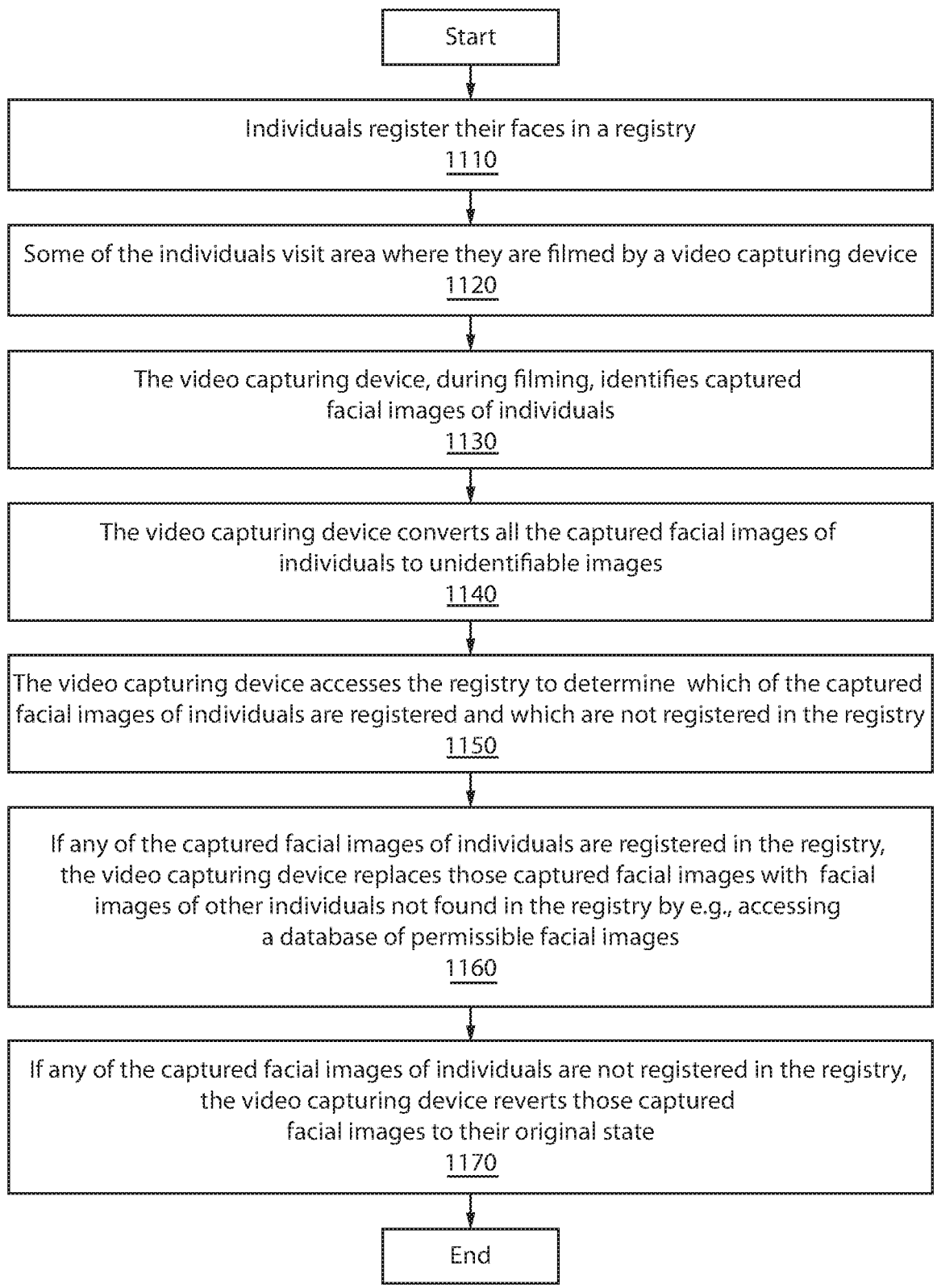
FIG. 11 is a block/flow diagram of an exemplary method for converting all facial images of individuals in a live video stream to unidentifiable images if the processing exceeds a predetermined time, and upon confirmation, replacing the facial images of individuals captured in a video stream with facial images of other individuals, in accordance with an embodiment of the present principles.

FIG. 11 is a block/flow diagram of an exemplary method for converting all facial images of individuals in a live video stream to unidentifiable images if the processing exceeds a predetermined time, and upon confirmation, replacing the facial images of individuals captured in a video stream with facial images of other individuals, in accordance with an embodiment of the present principles.

At block 1110, individuals register their faces in a registry.

At block 1120, one or more individuals visit areas or regions or sites where they are filmed or recorded by a video capturing device, such as a video camera.

At block 1130, during recording, the video camera captures facial images of individuals.

At block 1140, the video capturing device converts all the captured facial images of individuals to unidentifiable or unrecognizable images.

At block 1150, the video capturing device accesses the registry to determine which of the captured facial images of individuals are registered and which are not registered in the registry.

At block 1160, if any of the captured facial images of individuals are registered in the registry, the video capturing device replaces those captured facial images with facial images of other individuals not found in the registry by, e.g., accessing a database of permissible facial images.

At block 1170, if any of the captured facial images of individuals are not registered in the registry, the video capturing device reverts those captured facial images to their original state.

Figure 12:
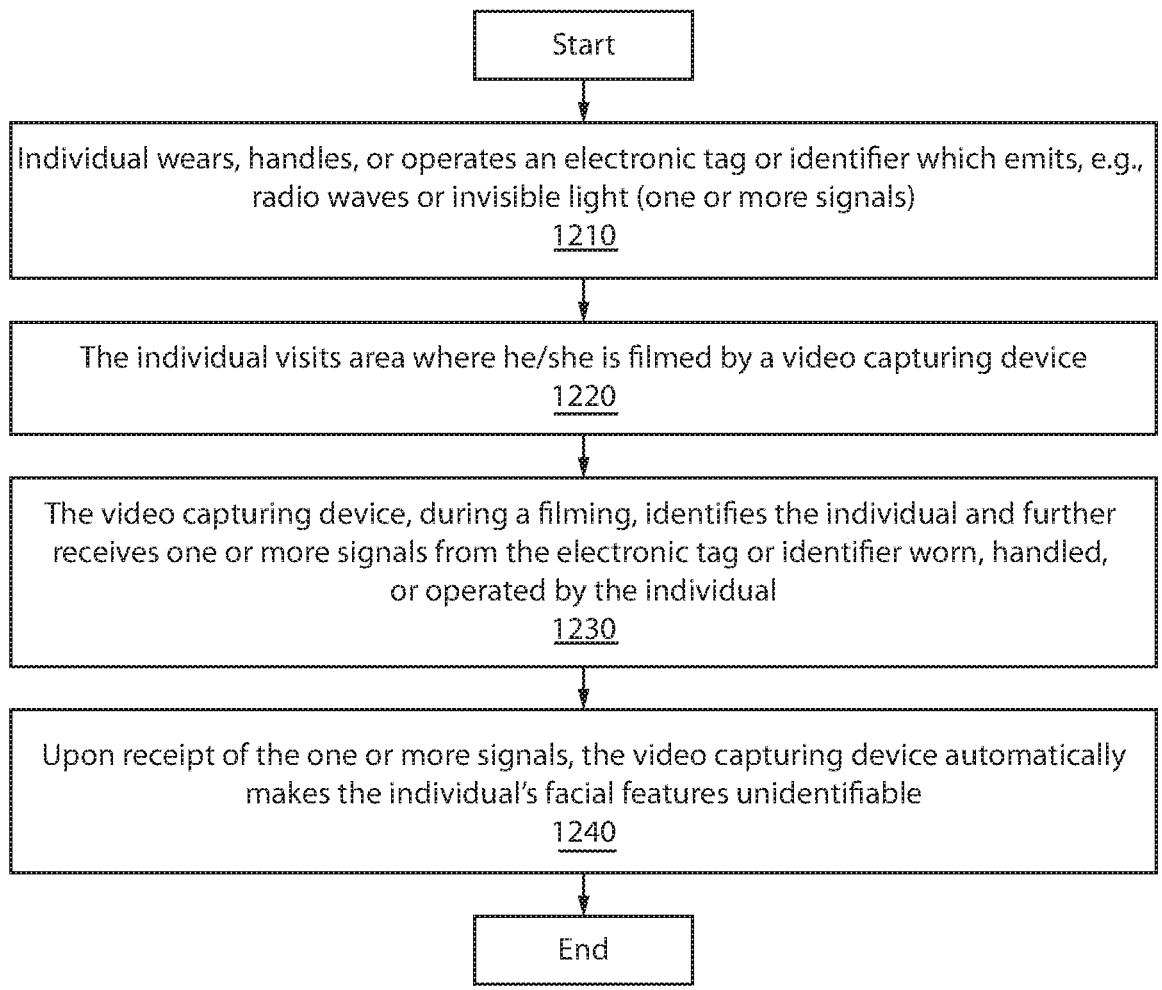
FIG. 12 is a block/flow diagram of an exemplary method for detecting an electronic tag associated with individuals captured in a live video stream, in accordance with an embodiment of the present principles.

FIG. 12 is a block/flow diagram of an exemplary method for detecting an electronic tag associated with individuals captured in a live video stream, in accordance with an embodiment of the present principles.

At block 1210, an individual wears, handles, or operates an electronic tag or electronic identifier which emits, e.g., radio waves or invisible light.

At block 1220, one or more individuals visit areas or regions or sites where they are filmed or recorded by a video capturing device, such as a video camera.

At block 1230, the video capturing device, during a filming or recording, identifies the individual and further receives one or more signals from the electronic tag or electronic identifier worn, handled, or operated by the individual.

At block 1240, upon receipt of the one or more signals, the video capturing device automatically makes the individual's facial features unidentifiable or unrecognizable.

Figure 13:
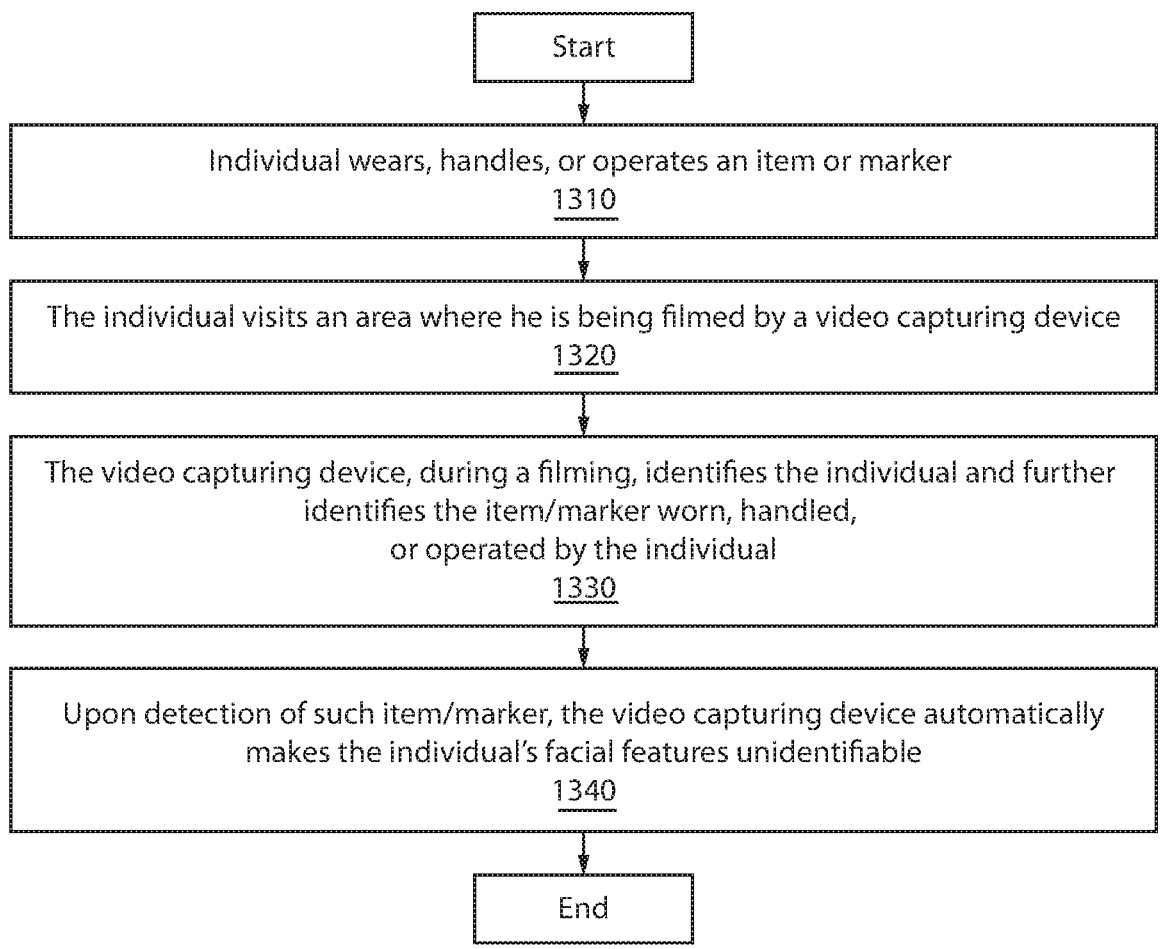
FIG. 13 is a block/flow diagram of an exemplary method for detecting an item or marker associated with individuals captured in a live video stream, in accordance with an embodiment of the present principles.

FIG. 13 is a block/flow diagram of an exemplary method for detecting an item or marker associated with individuals captured in a live video stream, in accordance with an embodiment of the present principles.

At block 1310, an individual wears, handles, or operates an item or marker.

At block 1320, one or more individuals visit areas or regions or sites where they are filmed or recorded by a video capturing device, such as a video camera.

At block 1330, the video capturing device, during a filming or recording, identifies the individual and further identifies the item or marker worn, handled, or operated by the individual.

At block 1340, upon detection of such item or marker, the video capturing device automatically makes the individual's facial features unidentifiable or unrecognizable.

In one or more embodiments, when the individual registers with the opt-out registry, the individual may select how his/her facial image is modified or obscured or transformed. For example, when the individual uploads his/her image to the opt-out registry, the individual may specify that he/she wishes for his/her facial image to be blurred when captured by a live video stream. Alternatively, the individual may specify that he/she wishes for his/her facial image to be substituted with an image of another person. Moreover, the individual may specify that he/she wishes for his/her facial image to be substituted with an image of a cartoon character. Therefore, the individual has the power to specify how his/her facial image is modified or transformed or obscured or obstructed. Such information would be sent to the video camera which would change the captured image as instructed.

In one or more embodiments, the video camera and/or opt-out registry may count the number of individuals captured in each recording or filming or live video stream and keep track of how many matches have occurred in each recording or filming or live video stream. The video camera and/or opt-out registry may store such information and create statistical and/or historical data/information. For instance, when a first recording is received by the opt-out registry, it is determined that 5 facial features were captured, and a match for 3 of them was verified via the opt-out registry. Then, a second recording is received by the opt-out registry, and it is determined that 7 facial features were captured, and a match for all 7 of them was verified via the opt-out registry. Then, a third recording is received by the opt-out registry, and it is determined that 4 facial features were captured, and a match for none of them was verified via the opt-out registry. All this collected data may be analyzed to determine, e.g., what percentage of individuals are registered with the opt-out registry in, e.g., different regions of a county or state or regions or country, or multiple countries etc. This data/information may enable the providers of the opt-out registry to target specific markets with advertisements to increase the number of people who register with the opt-out registry. Therefore, marketing efforts may be directly linked to the data collected and processed by the video camera 220 having the face recognition device 170, the signal detection device 174, and/or the marker detection device 176.

In one or more embodiments, a comparison may be made as to how many individuals used the opt-out registry versus the electronic identifiers versus the passive markers. For example, it may be determined that in one state most individuals used the opt-out registry, whereas in an adjacent state most individuals used the passive marker. This may be due to the fact that the individuals who used the opt-out registry, e.g., had better and more reliable access to the Internet. Maybe the easiest or less complicated way to access the opt-out registry is through a website.

In one or more embodiments, the individual captured in the live video stream may be notified by the opt-out registry that his/her image was obscured during a recording. The opt-out registry may communicate with each individual registered in the opt-out registry on, e.g., a monthly basis, or, e.g., a weekly basis, or, e.g., each time an image transformation has occurred. For instance, if an individual visits a certain area during a vacation, and walks along a main street, that individual may have been recorded 3 times by 3 different video cameras. After the 3 video cameras communicate with the opt-out registry and determine that a match has occurred, the opt-out registry may notify or warn the individual that he/she was recorded or filmed at that location during such specific time period. Thus, the individual may know exactly when and where he/she was recorded or filmed (and, e.g., may take precautions when visiting that area again). The individual may be notified, e.g., via his/her mobile device. The mobile device may be loaded with an opt-out registry software application that automatically notifies the individual that his/her facial images in a video recording were recently obstructed (as well as time and place). As a result, the opt-out registry may communicate directly with individuals to provide for status updates regarding their invasion of privacy in public.

In one or more embodiments, the opt-out registry may keep track of how many times an individual has been detected in a live video stream by a video camera. A list may be created with such individuals that have been filmed several times over different time periods. An analysis may be made, e.g., as to the geographical area of such individuals, to extract information that helps other individuals visiting such areas.

In one or more embodiments, based on the collected data/information, the opt-out registry may notify or warn individuals of "hot spots" where people are consistently being recorded or filmed. For example, if dozens of people who signed up for the opt-out registry had their faces obscured on a specific street in a specific city (say, $8^{th}$ street and Broadway, in Manhattan, N.Y.), then the opt-out registry may send out a signal or warning or notification to all registered members of the opt-out registry that such specific location is a "hot spot" for being filmed or recorded without one's consent. Based on this feedback, members registered with the registry may decide whether or not to pass by that "hot spot" location. Therefore, the opt-out registry may provide constant feedback and/or updates to the individuals that signed up. Additionally, the video camera may transmit GPS data/information to the opt-out registry. The opt-out registry may use the GPS data to, e.g., send reminders to individuals signed up that they are approaching a known "hot spot" or location where such individual was previously recorded or filmed and an image blurring or obstruction took place.

In one or more embodiments, the opt-out registry may provide a map of all the locations where the members who signed up with the registry had been previously filmed or recorded. The map may be used by members to avoid certain locations. These maps may be shared between members of the registry. These maps may be combined to create a super-map pinpointing all the locations where individuals were filmed or recorded without their consent. These maps may be uploaded to social media sites to educate people of where they are being filmed or recorded.

In one or more embodiments, the camera may locate a visual cue on the person. For example, such visual cue may be a QR code or some type of a distinct visual pattern. The visual pattern may be any type of, e.g., bar code. A bar code may refer to a machine-readable optical label that contains information about the item or person to which it is attached.

Figure 14:
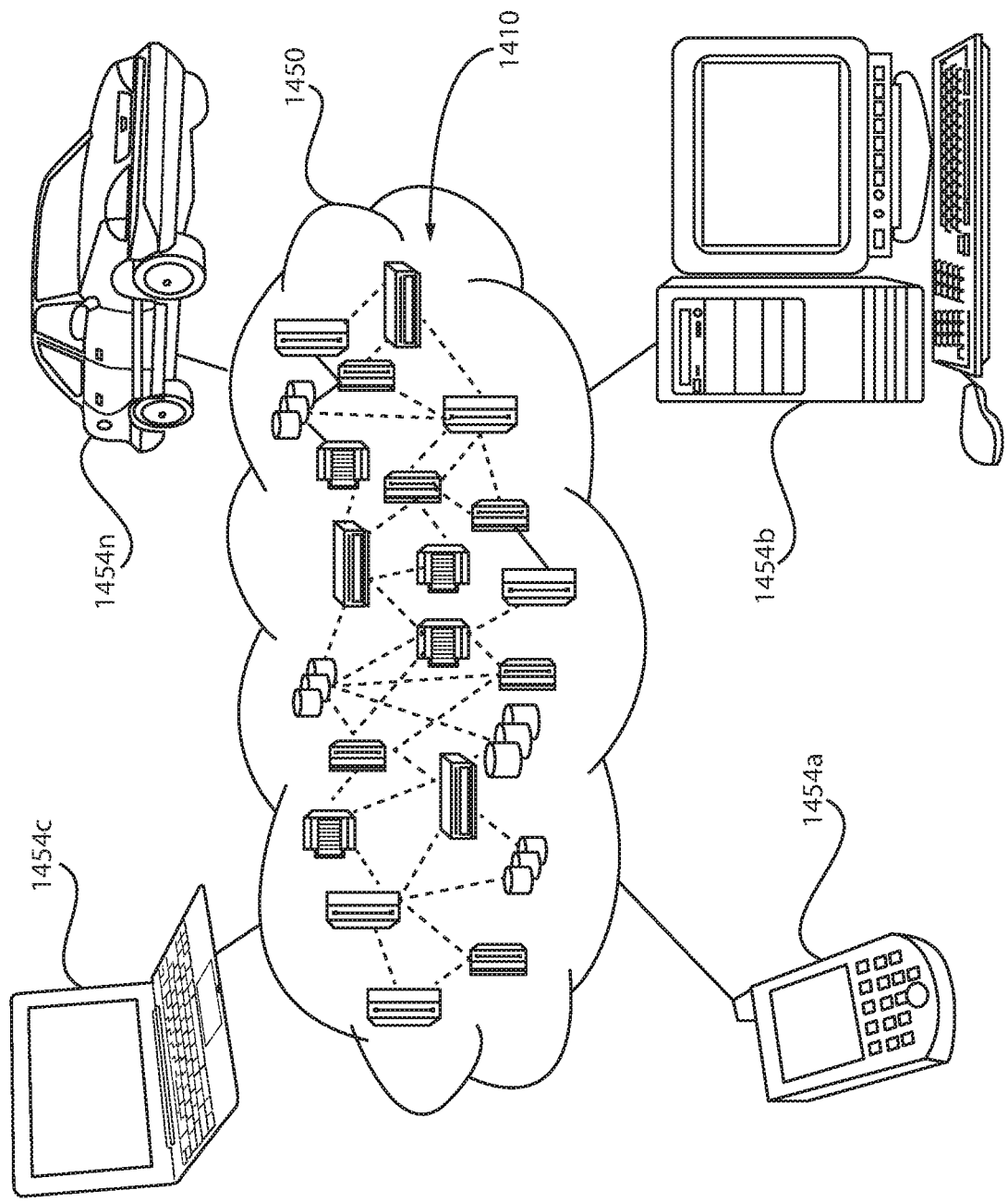
FIG. 14 is a block/flow diagram of an exemplary cloud computing environment, in accordance with an embodiment of the present principles.

FIG. 14 is a block/flow diagram of an exemplary cloud computing environment, in accordance with an embodiment of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 14, illustrative cloud computing environment 1450 is depicted for use with protecting anonymity of an individual in public. As shown, cloud computing environment 1450 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. The network may also be a network for protecting anonymity of an individual in public. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
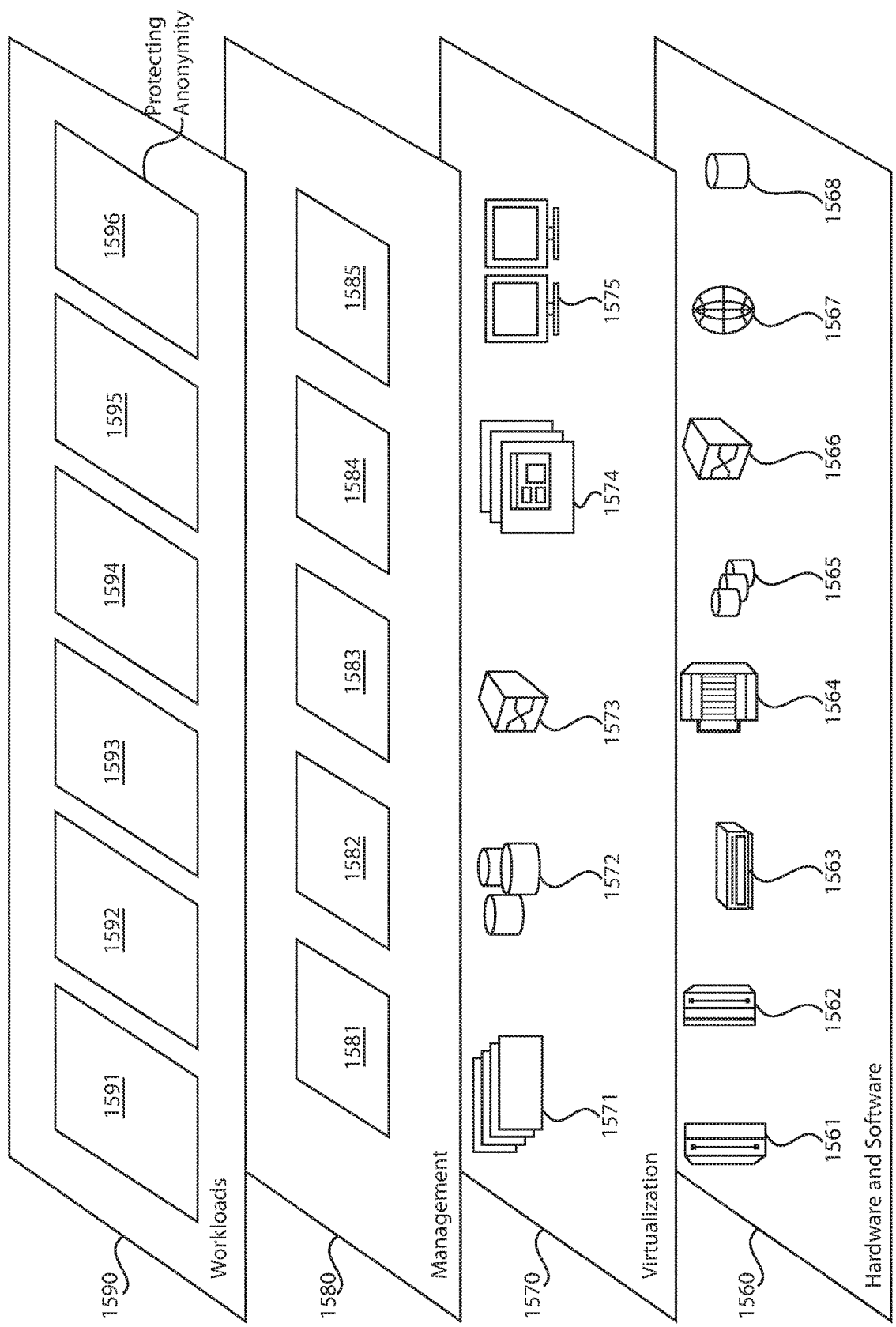
FIG. 15 is a schematic diagram of exemplary abstraction model layers, in accordance with an embodiment of the present principles.

FIG. 15 is a schematic diagram of exemplary abstraction model layers, in accordance with an embodiment of the present principles. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and protecting anonymity 1596.

Still yet, any of the components of the present invention could be created, integrated, hosted, maintained, deployed, managed, serviced, etc. by a service supplier who offers to provide a method for protecting anonymity of an individual in public with respect to a product or service. Thus the present invention discloses a process for deploying, creating, integrating, hosting, maintaining, and/or integrating computing infrastructure, including integrating computer-readable code into the computer system 100 (FIG. 1), wherein the code in combination with the computer system 100 is capable of performing a method for protecting anonymity of an individual in public with respect to a product or service. In another embodiment, the invention provides a business method that performs the process blocks/steps of the invention on a subscription, advertising, and/or fee basis. That is, a service supplier, such as a Solution Integrator, could offer to provide a method for protecting anonymity of an individual in public. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a plurality of processors for protecting anonymity of an individual, the method comprising:
    inputting, via a wireless device, a plurality of facial feature images associated with the individual in an opt-out registry;
    in response to capturing an image of the individual from a video stream generated by at least one video camera located in one area, in real-time, determining whether facial features associated with the individual captured in the video stream were detected in the opt-out registry by comparing the plurality of inputted facial feature images with facial feature images pre-stored in an opt-out registry database; and
    in response to the determination that the facial features associated with the individual were detected in the opt-out registry:
        blurring at the at least one video camera the facial features of the individual captured from the video stream with a blurred image pre-selected by the individual;
        notifying the individual, via the opt-out registry, (i) of a time and a location of recorded instances that triggered automatic generation of the individual's blurred image, (ii) of specific geographic locations where people are consistently being recorded without their consent, and (iii) by sending reminders to the individual when the individual approaches, in real-time, the specific geographic locations where other people are consistently being recorded, by employing global positioning system (GPS) data and by sending reminders to the individual when the individual approaches, in real-time, the specific geographic locations where such individual was previously recorded, by employing the GPS data; and
        generating a map including all specific geographic locations where all individuals signed up in the opt-out registry were previously recorded without their consent, the map shared between all the individuals signed up in the opt-out registry.

2. The method of claim 1, further comprising performing the determination that the facial features associated with the individual are detected in a predetermined time.

3. The method of claim 2, further comprising using the blurred image by default when the predetermined time exceeds a threshold.

4. The method of claim 3, further comprising, after the predetermined time exceeds the threshold and in response to a positive acknowledgement that the facial features associated with the individual are detected, maintain the blurred image on the image of the individual.

5. The method of claim 3, further comprising, after the predetermined time exceeds the threshold and in response to a negative acknowledgement that the facial features associated with the individual are detected, revert back to the image of the individual captured from the video stream.

6. The method of claim 1, wherein the opt-out registry is configured to count a number of individuals captured in the video stream and keep track of a number of matches occurring in the video stream.

7. The method of claim 6, wherein the opt-out registry is configured to create statistical and/or historical information based on the number of matches occurring in the video stream.

8. A computer-implemented method executed on a plurality of processors for protecting anonymity of an individual, the method comprising:
    capturing an image of the individual from a video stream;
    determining, in real-time, while the video stream generated by at least one video camera located in one area is being captured, whether an electronic identifier associated with a wireless device of the individual transmits one or more signals; and
    in response to the determination that the one or more signals of the electronic identifier associated with the individual are privacy signals:
        blurring at the at least one video camera, in real-time, while the video stream is being captured, facial features of the individual captured from in the video stream with a blurred image pre-selected by the individual;
        notifying the individual (i) of a time and a location of recorded instances that triggered automatic generation of the individual's blurred image, (ii) of specific geographic locations where people are consistently being recorded without their consent and (iii) by sending reminders to the individual when the individual approaches, in real-time, the specific geographic locations where other people are consistently being recorded, by employing global positioning system (GPS) data and by sending reminders to the individual when the individual approaches, in real-time, the specific geographic locations where such individual was previously recorded, by employing the GPS data; and generating a map including all specific geographic locations where all individuals were previously recorded without their consent, the map shared between all the individuals.

9. The method of claim 8, further comprising, in response to the determination that the one or more signals of the electronic identifier associated with the individual are not privacy signals, refraining from blurring the facial features of the individual captured from the video stream.

10. The method of claim 8, wherein the at least one video camera is configured to count a number of individuals captured in the video stream and keep track of a number of matches occurring in the video stream.

11. The method of claim 10, wherein the at least one video camera is configured to create statistical and/or historical information based on the number of matches occurring in the video stream.

12. The method of claim 8, further comprising determining whether a marker within a vicinity of the individual captured from the video stream is a distinctive marker.

13. The method of claim 12, further comprising, in response to verifying that the marker is the distinctive marker, blurring the facial features of the individual with the blurred image.

14. The method of claim 12, wherein the distinctive marker is a visual marker defining a predefined pattern and/or a quick response (QR) code.

15. The method of claim 8, wherein the one or more signals transmitted by the electronic identifier are either radio waves or infrared signals.

16. A system for protecting anonymity of an individual, the system comprising:

a memory to store a plurality of facial feature images associated with and input by the individual via a wireless device, in an opt-out registry; and a plurality of processors to analyze an image of the individual captured from a video stream generated by at least one video camera located in one area, in real-time, the plurality of processors configured to determine at the at least one video camera whether facial features associated with the individual captured in the video stream were detected in the opt-out registry by comparing the plurality of inputted facial feature images with facial feature images pre-stored in an opt-out registry database;

wherein, in response to the determination that the facial features associated with the individual were detected in the opt-out registry:

blur at the at least one video camera the facial features of the individual captured from the video stream with a blurred image pre-selected by the individual;

notify the individual, via the opt-out registry, (i) of a time and a location of recorded instances that triggered automatic generation of the individual's blurred image, (ii) of specific geographic locations where people are consistently being recorded without their consent, and (iii) by sending reminders to the individual when the individual approaches, in real-time, the specific geographic locations where other people are consistently being recorded, by employing global positioning system (GPS) data and by sending reminders to the individual when the individual approaches, in real-time, the specific geographic locations where such individual was previously recorded, by employing the GPS data; and generate a map including all specific geographic locations where all individuals signed up in the opt-out registry were previously recorded without their consent, the map shared between all the individuals signed up in the opt-out registry.

17. The system of claim 16, wherein the plurality of processors further determine whether the facial features associated with the individual were detected within a predetermined time.

18. The system of claim 17, wherein the blurred image is used by default when the predetermined time exceeds a threshold.

19. The system of claim 18, wherein, after the predetermined time exceeds the threshold and in response to a positive acknowledgement that the facial features associated with the individual are detected, the blurred image on the individual is maintained.

20. The system of claim 18, wherein the opt-out registry is configured to count a number of individuals captured in the video stream and keep track of a number of matches occurring in the video stream.

* * * * *